United States Patent [19]
Young

[11] Patent Number: 5,272,928
[45] Date of Patent: Dec. 28, 1993

[54] APPARATUS FOR THE TRANSMISSION OF POWER TO A ROTATING MEMBER

[76] Inventor: Douglas M. Young, 89 Virginia Avenue, Hawthorne, Queensland 4171, Australia

[21] Appl. No.: 752,585
[22] PCT Filed: Feb. 23, 1990
[86] PCT No.: PCT/AU90/00077
§ 371 Date: Aug. 23, 1991
§ 102(e) Date: Aug. 23, 1991
[87] PCT Pub. No.: WO90/09919
PCT Pub. Date: Sep. 7, 1990

[30] Foreign Application Priority Data

Feb. 23, 1989 [AU] Australia .................. PJ2884

[51] Int. Cl.⁵ .................. B62M 1/12; F16H 29/00; A63B 22/12
[52] U.S. Cl. .................. 74/137; 280/234; 280/246; 280/288.1; 482/62
[58] Field of Search .............. 74/136, 137; 280/233, 280/234, 246, 255, 288.1; 482/62

[56] References Cited

U.S. PATENT DOCUMENTS

| | | | |
|---|---|---|---|
| 314,236 | 3/1885 | Gormley | 280/234 |
| 565,556 | 8/1896 | Murray | 280/234 |
| 1,154,616 | 9/1915 | Davis | 280/234 |
| 1,368,696 | 2/1921 | Butterfield | 74/136 X |
| 2,025,446 | 12/1935 | Frantz | 74/136 X |
| 3,759,543 | 9/1973 | Clark | 280/255 |
| 3,834,733 | 9/1974 | Harris | 280/251 |
| 3,884,501 | 5/1975 | Elias et al. | 280/251 |
| 3,895,825 | 7/1975 | Sink | 280/234 |
| 3,910,599 | 10/1975 | Thomas | 280/234 |
| 3,913,945 | 10/1975 | Clark | 280/233 |
| 4,117,915 | 10/1978 | Young | 280/255 |
| 4,147,370 | 4/1979 | Lindsey, Jr. | 280/234 |
| 4,437,677 | 3/1984 | Ksayian | 280/234 |
| 4,666,173 | 5/1987 | Graham | 280/255 |
| 4,811,964 | 3/1989 | Horn | 280/250.1 |

FOREIGN PATENT DOCUMENTS

| | | |
|---|---|---|
| 577702 | 6/1986 | Australia . |
| 574588 | 7/1988 | Australia . |
| 0000228 | 1/1979 | European Pat. Off. . |
| 3737294 | 5/1989 | Fed. Rep. of Germany . |
| 1017580 | 5/1983 | U.S.S.R. .................. 280/234 |
| 2151562 | 6/1984 | United Kingdom . |

Primary Examiner—Allan D. Herrmann
Attorney, Agent, or Firm—Hoffman, Wasson & Gitler

[57] ABSTRACT

The provision of power by the human body to bicycles, tricycles, exercise equipment, wheeled chairs or the like is effected using a hand-operated lever (35) and/or a pair of pendulums (23). The hand-operated lever is pivoted about an axle (33) on a frame (12) of the cycle or other equipment. Rotation of the lever about that axle in either direction causes a respective sprocket wheel (38) to rotate about an associated axis, with consequential rotation of a rotatable member (14) which drives the cycle or other equipment. A tensioning or recoil mechanism (40,42) returns the sprocket wheel or drum to its original position when the lever is rotated in the opposite direction about the axle. Similarly, forward movement of a pendulum about the axle (22) from which it depends causes an associated different sprocket wheel (28) or drum to rotate about the axis to cause the rotatable member to move and drive the cycle or other equipment. If the invention is applied to a cycle that can be propelled, a steering mechanism for the cycle is also provided, operated via handlebars (31) attached to the top of the lever (35).

20 Claims, 4 Drawing Sheets

APPARATUS FOR THE TRANSMISSION OF POWER TO A ROTATING MEMBER

TECHNICAL FIELD

This invention concerns the production of power by human endeavour. More particularly it concerns the production of power at a rotating or rotatable shaft by a human being. The invention was designed for the more efficient propulsion of a wheeled vehicle by its occupants, in which form it may be used to propel a bicycle. However, it is applicable also to the propulsion of tricycles and four-wheeled cycles, to wheeled chairs, to exercise bicycles and other exercise machines, and to electrical power generation. For convenience, the invention will be described in this specification with particular emphasis being given to its bicycle application.

BACKGROUND TO THE INVENTION

The basic design of the bicycle has progressed little during the last thirty years. Most bicycles are driven by a chain which connects a crank wheel (also called a chain wheel or a sprocket wheel) to the hub of a wheel of the bicycle (usually the rear wheel). The crank wheel or chain wheel is rotated by a rotary pedalling action by the rider of the bicycle, who sits astride the bicycle in an essentially upright position.

Among recent developments in bicycles are lever propelled cycles and cycles propelled by a rowing action (sometimes in conjunction with another propulsion mechanism). For example, lever propelled bicycles are featured in the specifications of (a) U.S. Pat. No. 3,834,733 (to Trevor L. Harris);
(b) U.S. Pat. No. 3,913,945 (to Marion A. Clark);
(c) U.S. Pat. No. 4,117,915 (to Timothy Tung Jen Young);
(d) U.S. Pat. No. 4,666,173 (to Garnard E. Graham:; and
(e) Australian patent No. 577,702 (to Alenax Corporation).

Among the bicycles propelled by rowing are the "ROWCYCLE" produced by Rowcycle Corporation of Fresno, Calif., and the cycle featured in the specification of U.S. Pat. No. 4,147,370 (to Ben Lindsey Jr).

An exercise bicycle utilizing both a rowing and a circular pedalling action is described in UK patent publication No. GB-A-2151562 (of UK patent application No. 8415700 to Antonio G. Zarco). The specification of Australian patent No. 574,588 (to Y Wu) describes a dual system bicycle propelled by conventional rotary pedalling assisted by an up and down movement of a handle device which is also used to steer the bicycle.

A "rowing" exercise cycle is described by Robert L. Sink in the specification of his U.S. Pat. No. 3,895,825. With that equipment, rotation of the rear wheel of the exercise cycle is achieved by the oscillatory movement of a driving column by the user's hands and feet.

With the exception of the "ROWCYCLE" (which is a tricycle), these prior art cycles all require the operator to sit astride the cycle in a conventional manner. The "ROWCYCLE" operator can adopt a reclined position-as can the operator of the combined hand-pedalled and foot-pedalled, front wheel driven bicycle described in the specification of U.S. Pat. No. 3,910,599 (to John C. Thomas).

DISCLOSURE OF THE PRESENT INVENTION

As some of the designers of the lever driven cycles referred to above may have appreciated, a rotary pedalling action is not the most efficient way of utilising the strength characteristics of the human leg. The nearer the leg is to being straight, the more power it can deliver. For example, it has been reported that the human leg, when pushing the foot away from the body in a straight line (as in raising the body from a squatting position to a standing position) can exert 80 percent more force when the leg is almost straight than it can when the leg is fully bent. Thus, ideally, the power that is transmitted to the driving hub of a bicycle should be transmitted while the leg is straightening, and most power should be delivered at the end of the straightening action of the leg. However, in the conventional pedalling action of a bicycle, most power is provided to the bicycle before the leg of the rider reaches its most straightened position.

It will be apparent from a review of the above-mentioned prior art that in the development of mechanisms for propelling a cycle, only limited attention has been given to the possibility of using the rider's arms to assist or perform the propulsion of the cycle. However, not every person has full normal use of his or her legs, and persons unable to use their legs are deprived from cycling. Manual self-propulsion of such persons is essentially restricted to the use of wheeled chairs, the driving mechanism of which has undergone little development since it was first conceived and implemented.

It is an object of a first aspect of the present invention to provide a novel arrangement by which power is applied to the driving hub of a bicycle (or to an equivalent rotatable member in other equipment) at all times during a straightening action of the leg of a rider of the bicycle (or the operator of the other equipment), thus improving the efficiency of propelling the bicycle (or rotating the rotatable member).

It is an object of a second aspect of the present invention to provide an improved arrangement whereby power can be applied to a cycle, to a wheeled chair, or to an equivalent rotatable member in other equipment, using an arm (or both arms) of the person riding or operating the cycle, wheeled chair or other equipment, to increase the efficiency and ease by which the cycle or wheeled chair can be propelled or the other equipment can be operated.

The objective of the first aspect of this invention is achieved by providing a chain wheel that, instead of being rotated by a pair of pedals mounted on the ends of arms connected directly to the chain wheel (as in the conventional bicycle pedalling arrangement), is driven by two sprocket wheels or two drums mounted coaxially with the chain wheel. If sprocket wheels are used, each sprocket wheel is provided with a ratchet arrangement, with a roller clutch, or with any other arrangement permitting rotation of the sprocket wheel only with the axle on which it is mounted when the sprocket wheel is rotated in one direction but free movement about the axle on which it is mounted when the sprocket wheel is rotated in the opposite direction. A respective chain passes around part of each sprocket wheel. Each of these chains has one of its ends connected to a tensioning or recoil arrangement mounted on the frame of the bicycle or other equipment. The other end of each chain is connected to a point on a respective one of a pair of rods, each rod being pivotally connected at or near one end thereof to the frame of the bicycle (or other equipment). The other (free) end of each of these rods is adapted to be moved in an arc under the influence of pressure from a respective foot of the rider of the bicycle (or user of the equipment), who is seated in a reclined position. The point on the rod (or pendulum, as I prefer to call it) to which the chain is connected is located between the pivot point of the pendulum and its free end.

With such an arrangement, when one of the two pendulums is moved by (and away from) the rider of the bicycle, the connection to its associated chain is moved away from the axis of the crank or chain wheel. Thus the chain is pulled and drives its respective sprocket wheel, and hence drives the crank or chain wheel. At the end of this movement of the pendulum, if the force applied to the pendulum is removed, the chain (and also its associated pendulum) moves back to its original position under the action of the tensioning or recoil arrangement. This movement to the original chain position is possible because each sprocket wheel is equipped with a ratchet arrangement, a roller clutch or the like.

If the alternative drums are used, each drum is mounted on the axle of the chain wheel by a ratchet, roller clutch or similar arrangement. Each drum is fitted internally or externally with a recoil arrangement. In this alternative (but mechanically equivalent) arrangement, a cable fixed to a point on the circumference of a respective drum and wound around the drum is connected to an associated pendulum. Movement of the pendulum causes the drum to rotate in the same manner as the sprocket wheels described above.

It will be appreciated that each pendulum can be operated independently of the other pendulum.

Thus according to the first aspect of the present invention, there is provided a driving mechanism for a first rotatable member which is fixedly mounted on a first axle which is supported for rotation on a frame, said driving mechanism comprising a) a pair of second rotatable members mounted coaxially with the first rotatable member and connected to said first axle by an arrangement which permits rotation with said first axle in one direction of rotation but free movement about said first axle in the opposite direction of rotation, each second rotatable member comprising either a sprocket wheel or a drum;

b) a pair of pendulums, each pendulum having an upper end and a lower end and being mounted at or near the upper end thereof for rotation about a second axle mounted on said frame remote from said first axle, the lower end of each pendulum being moveable in an arc from a rearward position to a forward position;

c) a pair of chains (if the second rotatable members are sprocket wheels) or cables (if the second rotatable members are drums), each said chain passing partly around and engaging with the sprocket teeth of a respective one of said sprocket wheels or each said cable passing at least partly around the outer surface of a respective one of said drums and being connected thereto, one end of each said chain or cable being connected to a respective one of said pendulums at a point between said second axle and said lower end of the pendulum, whereby movement of the lower end of each pendulum from its rearward position to its forward position causes its associated chain or cable to be pulled around, and thereby rotate, its respective sprocket wheel or drum, to rotate said first axle and hence said first rotatable member; and d) biasing means associated with each said chain or each said drum, for biasing its associated chain or drum in the opposite direction to the direction of movement thereof which causes rotation of said first axle, and hence for biasing its associated pendulum to its rearward position.

If sprocket wheels are used in the driving mechanism, the ends of the chains which are not connected to the pendulums are connected to their associated bias means, which typically will comprise a respective tension spring arrangement which is also connected to the frame. However, the chains need not extend from the pendulums to the tensioning arrangements but may be connected to a cable or rod at either end (or both ends) thereof, with the or each such cable or rod being connected to either the tensioning means or the pendulum.

In the case of a bicycle, tricycle, exercise cycle or the like, the first rotatable member will be the chain wheel used to drive the driving wheel of the cycle. In addition, the frame will be the cycle frame, which will also support a seat for the rider of the cycle. The seat should be positioned to enable the rider to adopt a reclining position with the pendulums in front of the rider.

For optimum delivery of power to a pendulum by a human leg, the pendulums should have a geometry such that when the pendulum is pushed while the knee of an operator is bent, the chain (or cable) moves a shorter distance for a given displacement of the foot of the operator than when the same displacement of the foot is effected with the operator's leg almost straight. Alternatively, the sprocket wheels (or drums) may be provided with a progressively varying radius (for example, by being mounted eccentrically), so that the first rotatable member is driven through a greater angle for a given displacement of the operator's foot when the leg of the operator is almost straight than when the same foot displacement is effected with a bent leg. A combination of selected pendulum geometry and varying radius sprocket wheel (or drum) may be adopted.

If arms as well as legs are to be used to rotate the first rotatable member, an additional driving arrangement for the first rotatable member may be provided in the form of a rod that is mounted for rotation about a third axle mounted on the frame, through an acute angle, by movement of the arms of the operator of the equipment. Such rotation of this rod causes at least one chain or cable connected to the rod to drive a respective unidirectional sprocket wheel or drum (that is, a sprocket wheel or drum equipped with a ratchet arrangement, a roller clutch or the like) that is mounted coaxially with the first rotatable member and is connected to the first axle. This feature of an arrangement whereby the arms of a person may be used to propel a cycle is optional in general. However, in the case of cycles for persons without normal use of their legs and in the case of wheeled chairs, this feature is essential. Indeed, this feature represents the achievement of the second aspect of the present invention.

Thus the present invention also encompasses an arm-operated driving mechanism for a first rotatable member which is fixedly mounted on a first axle which is supported for rotation on a frame, said driving mechanism comprising a) a pair of second rotatable members mounted coaxially with the first rotatable member and connected to said first axle by an arrangement which permits rotation with said first axle in one direction of rotation but free movement about said first axle in the opposite direction of rotation, each second rotatable member comprising either a sprocket wheel or a drum;

b) a hand-moveable lever having an upper end and a lower end, said lever being mounted on a second axle supported on said frame remote from said first axle, said lever being rotatable about said second axle in a substantially vertical plane between a first position in which said upper end is in a forward position and a second position in which said upper end is in a rearward position; said lever having first and second connection points thereon;

c) a pair of chains (if the second rotatable members are sprocket wheels) or cables (if the second rotatable members are drums), each said chain passing partly around and engaging with the sprocket teeth of a respective one of said sprocket wheels or each said cable passing at least partly around the outer surface of a respective one of said drums and being connected thereto, one end of each said chain or cable being connected to a respective one of said connection points, whereby movement of said lever from said first position to said second position causes one of said chains of cables to be pulled around, and thereby rotate, its respective sprocket wheel or drum, to rotate said first axle and hence said first rotatable member, and movement of said lever from said second position to said first position causes the other of said chains or cables to be pulled around, and thereby rotate, its respective sprocket wheel or drum, to rotate said first axle and hence said first rotatable member; and d) biasing means associated with each said chain or each said drum, for biasing its associated chain or drum in the opposite direction to the direction of movement thereof which causes rotation of said first axle.

These and other features of the present invention will be more readily understood from the following description of embodiments which include the present invention, predominantly in its application to a bicycle. In the following description, which is provided by way of example only, reference will be made to the accompanying drawings.

BRIEF DESCRIPTION OF THE ACCOMPANYING DRAWINGS

DETAILED DESCRIPTION OF THE ILLUSTRATED EMBODIMENTS

Figure 1:
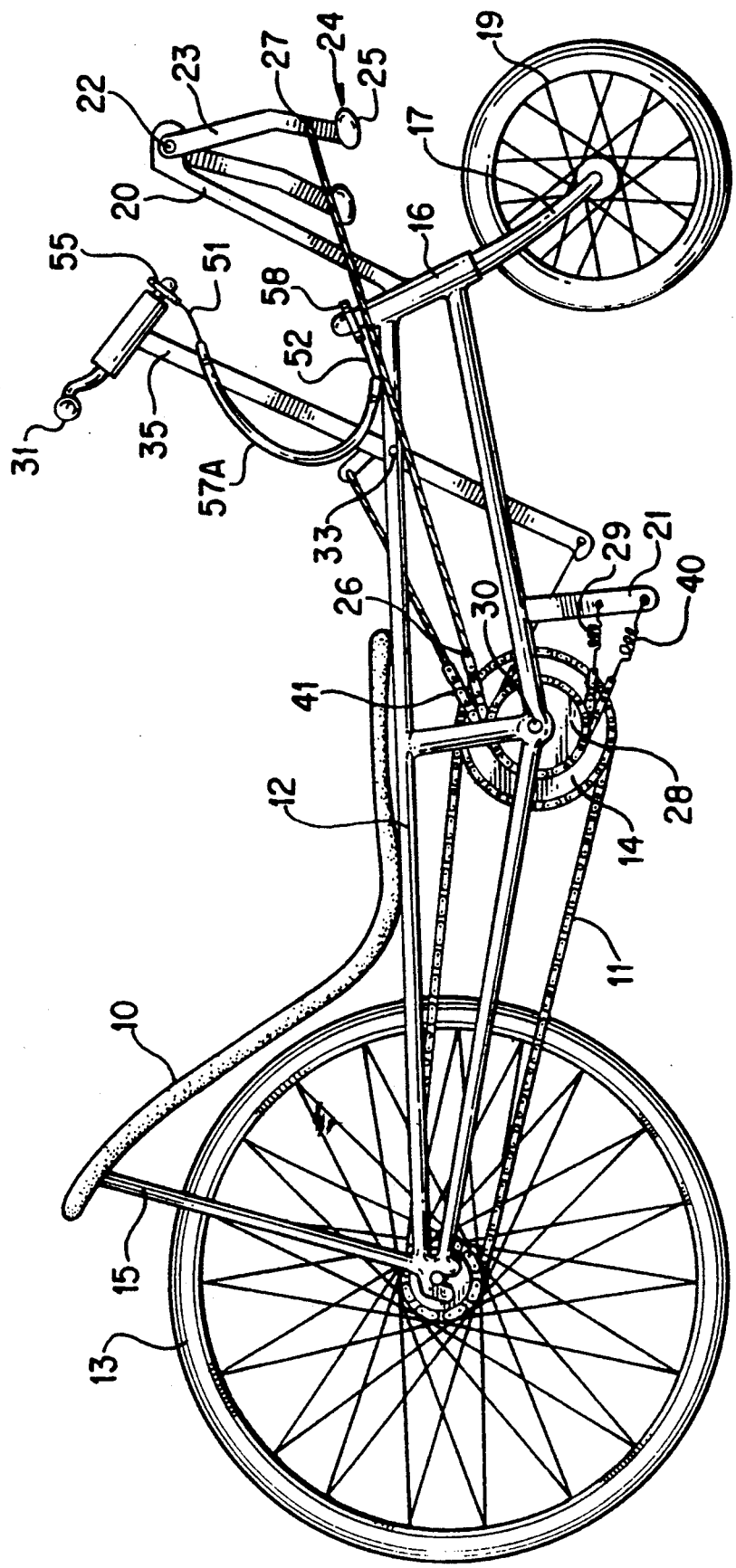
FIG. 1 is a diagram showing (partly schematically) the frame of a cycle equipped with the preferred propulsion arrangement of the present invention.

The cycle illustrated in FIG. 1 has a seat 10 mounted on a cycle frame 12. The cycle frame 12 also supports a rear wheel 13 that is driven by a chain 11 that passes around a chain wheel 14. A seat back bracing rod 15 extends from a point on the frame 12 that is close to the mounting location of the axle of the rear wheel 13 to the seat back. A steering head member 16 forming the front part of the frame 12 is adapted to carry within it the conventional shaft that extends from a front fork 17 to the steering mechanism of the cycle. The front wheel 19 of the cycle is mounted in the front fork.

An extension of the cycle frame beyond the steering head member 16 constitutes a pendulum support bar 20. A pair of pendulums 23 are pivotally connected to the top of the support bar 20, so that they are free to move about an axle 22 mounted at the top end of the support bar 20. A foot of a rider of the cycle will normally be placed on a pedal 25 mounted at, or near, the end 24 of the pendulum 23. Known alternatives to the pedals 25 may be used. The shape of each pendulum is preferably chosen to enable its free end 24 (that is, the end of the pendulum that is remote from axle 22) to be moved forwards by the action involved in straightening a leg of a rider of the cycle who is sitting on the seat 10.

One end of a respective chain 26 (one only is shown in FIG. 1) is connected to each pendulum 23 (preferably via a connecting cable 26A or a connecting rod) at a connection point 27. Each chain 26 passes around a respective sprocket wheel 28. The other end of the chain 26 is connected to a tension member 29 (the biasing means of the present invention) which, in turn, is connected to an extension bar 21 extending from the cycle frame.

In the drawings, the tension member 29 is shown as a helical tension spring. However, it should be appreciated that a tension spring has been shown to illustrate one feature of the present invention and that, in practice, other known forms of tensioning means or retracting (recoil) mechanisms may be used in place of a helical tension spring.

The sprocket wheel 28 is mounted on the same axle 30 as the chain wheel 14, and is thus connected to the chain wheel 14 by the axle 30. The sprocket wheel 28 is also provided with a ratchet arrangement, a roller clutch or the like, so that it is, effectively, a unidirectional sprocket wheel as far as driving the axle 30 is concerned.

Figure 2:
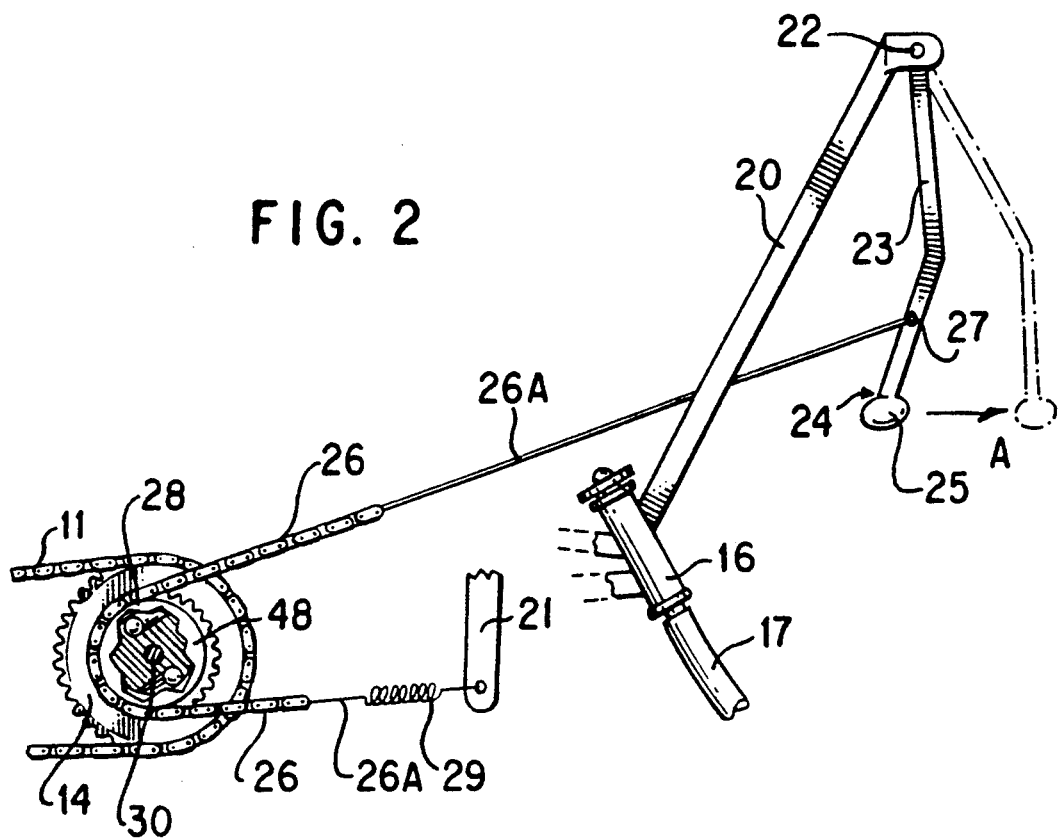
FIG. 2 illustrates how a single pendulum is connected via its associated drive chain to a sprocket wheel mounted directly on the axle of the chain wheel of a cycle.
Figure 3:
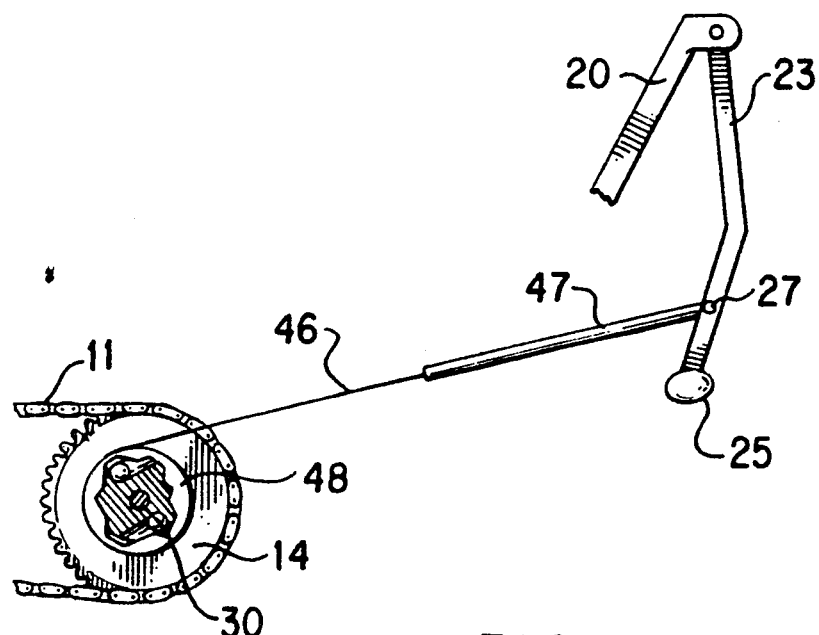
FIG. 3 illustrates the connection between a pendulum and its associated drum mounted directly on the axle of the chain wheel of a cycle.

Referring now to FIGS. 2 and 3, it will be seen that if the pedal 25 on a pendulum 23 is pushed in the direction of the arrow A so that the pendulum moves from its rearmost position (shown in firm outline) to its forward position (shown in dashed outline), the connection point 27 moves as the pendulum moves.

In the arrangement shown in FIG. 2, this movement of the connection point 27 pulls the chain 26 around sprocket wheel 28 and the tension spring 29 is thereby extended. The movement of the chain 26 causes the sprocket wheel to move the axle 30 and thus to rotate the chain wheel 14. It will be seen that in the arrangement depicted in FIG. 2, the chain 26 is connected to the pendulum 23 and to the tension spring 29 by lengths of cable 26A.

If the pressure on the pedal 25 is removed when the pendulum reaches its forward position, the tension spring 29 can contract and pull the chain 26 back to the position shown in FIG. 2. The ratchet or roller clutch arrangement of the sprocket wheel 28 permits the sprocket wheel to move freely around the axle 30 as the chain 26 is pulled back.

In a similar manner, in the arrangement shown in FIG. 3, the forward movement of the connection point 27 pulls a rod 47 connected to a cable 46 that is wound around, and is attached to, a drum 48. The drum 48 is connected via a ratchet or roller clutch arrangement, or the like, to the axle 30. The consequential "unwinding" of the cable 46 rotates the drum 48 and hence the axle 30, and thus rotates the chain wheel 14. Removal of pressure from the pedal 25 when the pendulum has reached its forward position results in a recoil mechanism within or external to the drum (the biasing means of this invention) operating to rotate the drum in the opposite direction on its ratchet or roller clutch connection to the axle 30. This action re-winds the cable around the drum 48 and returns the pendulum 23 to its rearward position.

The sprocket wheels 28 or drums 48 that are driven by the pendulums 23 will normally be mounted one on each side of the chain wheel 14 on the axle 30.

It will be appreciated that the axle 30 may be replaced by its mechanical equivalent arrangement, namely, a hub mounted for rotation about a fixed axle. In this alternative arrangement, the chain wheel 14 will be rigidly attached to the hub and the sprocket wheels 28 or the drums 48 will be connected, via ratchet, roller clutch or similar arrangements, to the hub and not to the axle.

In the preferred form of the present invention, when the pedals on the pendulums are pushed further from the rider, the geometry adopted for the pendulums 23 ensures that there is a greater displacement of the chain 26 (or cable 46) per unit of movement of a pedal 25. This geometry (or, as indicated earlier in this specification, the adoption of a sprocket wheel 28 or drum 48 having a varying radius) takes advantage of the strength characteristics of the human leg to enable a relatively constant torque to be applied to the chain wheel 14 as the pedals 25 are pushed by the rider of the bicycle.

A particularly useful feature of the present invention is the independent operation of each pendulum 23. Thus the present invention permits a one-legged rider to operate one pendulum and propel the cycle (though normally, if a one-legged person is to propel it, the cycle will be a tricycle or a cycle having four wheels, since a one-legged person would experience difficulty in balancing a bicycle constructed in accordance with the present invention). With a two-legged rider of a cycle constructed in accordance with the present invention, steady torque can be applied to the driving (rear) wheel by the relatively slow forward movement of one pendulum until it has travelled, say, half of its forward movement, whereupon the second pendulum can be brought into play. As soon as the first pendulum reaches its forward position (or before that point is reached) the first pendulum may be rapidly withdrawn to its rearmost position and again used to propel the cycle. Thus there need be no interruption to the application of torque to the drive of a cycle when the present invention is adopted (in contrast to most of the prior art discussed above).

Figure 4:
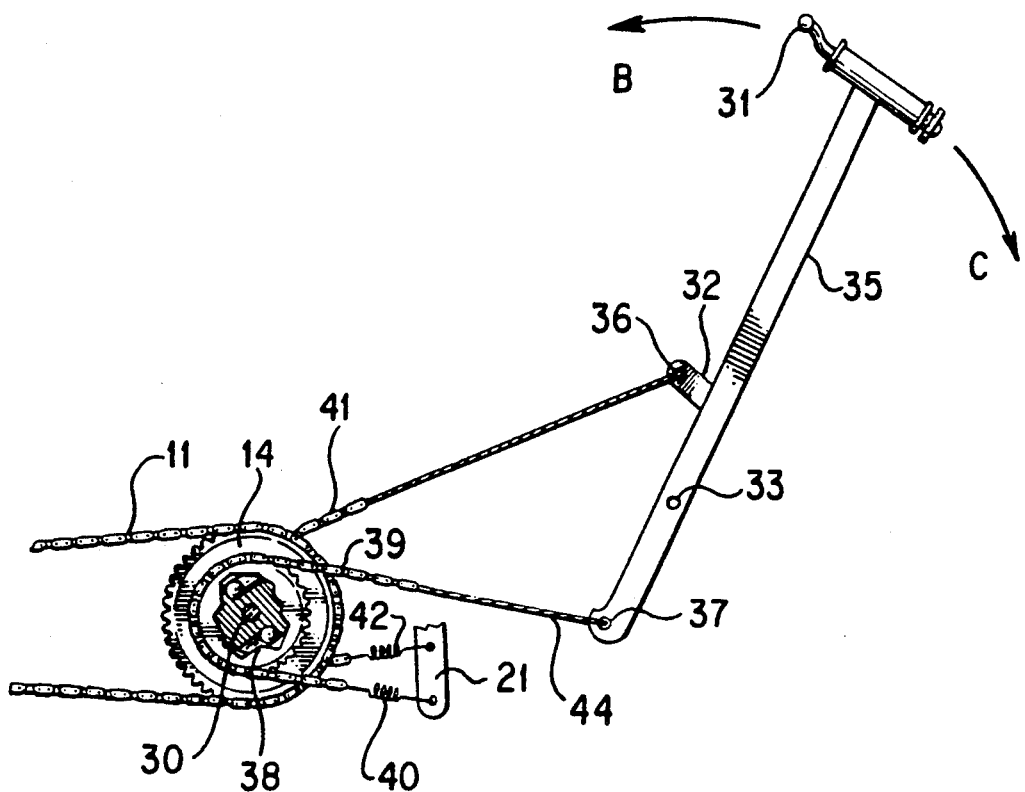
FIG. 4 illustrates one arrangement of an optional additional propulsion mechanism, provided by a pivoted handlebar support rod.

The embodiment featured in FIG. 1 includes an optional additional propulsion means, namely a pivoted handlebar support rod 35. One embodiment of a pivoted handlebar support rod 35 is also shown in FIG. 4. The support rod 35 is rotatable through acute angles about a short shaft or axle 33 mounted on the cycle frame 12. Handlebars 31, which form part of the steering mechanism of the cycle, are mounted at the top end of the support rod 35.

Figure 6:
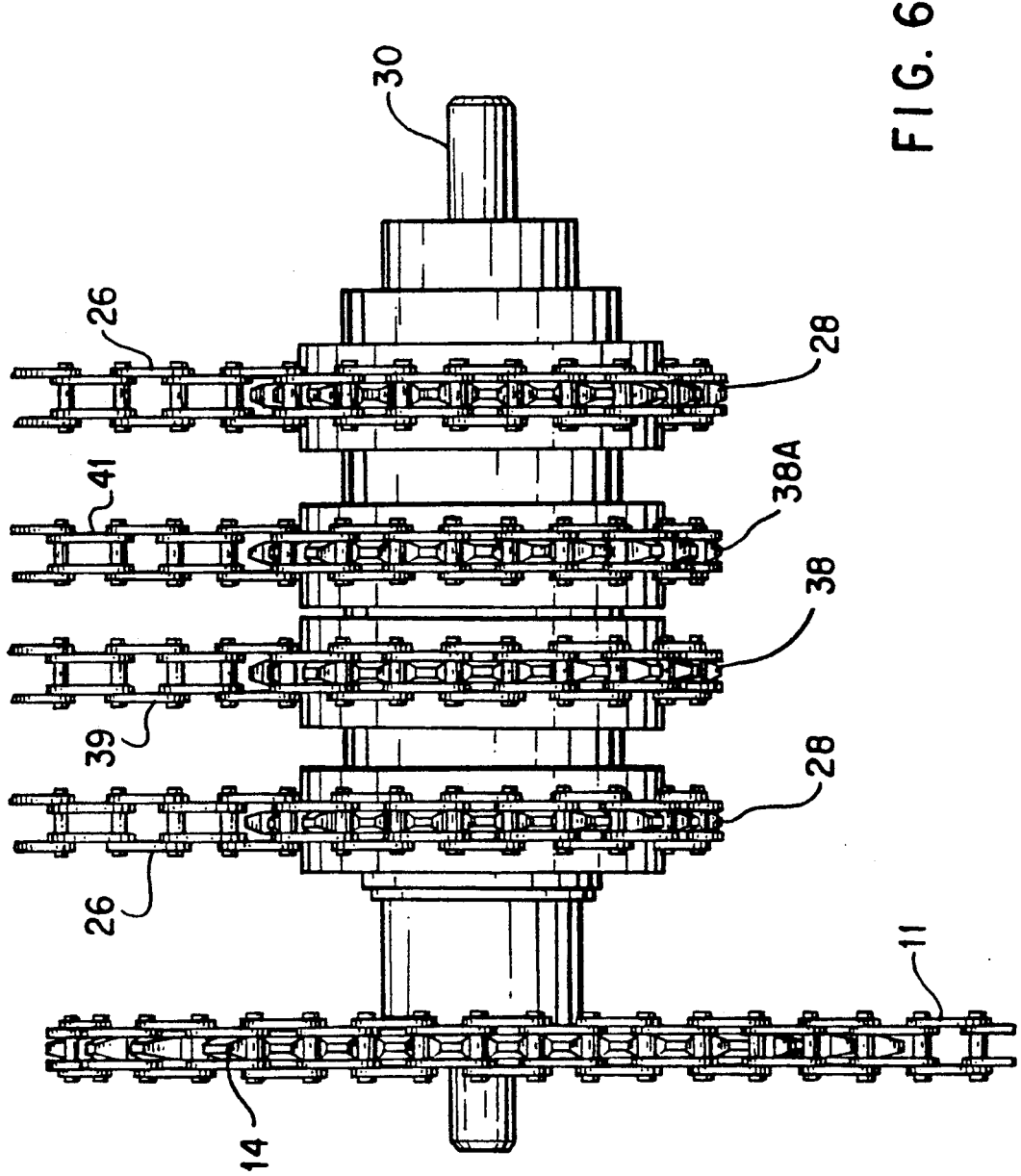
FIG. 6 shows a plan view of the sprocket wheels, the chain wheel and their associated drive chains as they are mounted on the axle of the cycle.

A lug 37 or an equivalent connection point is provided at the lower end of the rod 35. A chain 39 is connected to the lug 37 (via cable 44) and passes around a sprocket wheel 38 (engaging with the teeth thereof) to be connected to one end of a tension spring 40 (or an equivalent tensioning or recoil arrangement attached to the bar 21 which extends from the frame 12). The sprocket wheel 38, which is not shown in FIGS. 1, 2 or 3, but is shown on FIG. 6 is a unidirectional sprocket wheel that is similar to the sprocket wheels 28, and is mounted on the same axle 30 as the sprocket wheels 28 and the chainwheel 14.

A further chain 41 is connected to a second lug 36 at the end of a short bar 32, extending from the support rod 35. The chain 41 passes around a respective sprocket wheel 38A that is also a unidirectional sprocket wheel and mounted on the hub 30. The other end of the chain 41 is connected to a further tension spring 42 that is connected to the bar 21.

When the rider of the cycle pulls the handlebars 31 in the direction of arrow B, the movement of the lug 37 at the other end of the handlebar support rod 35 causes chain 39 to be pulled against the action of the tension spring 40. The consequent movement of chain 39 around the sprocket wheel 38 causes rotation of the axle 30 and thus rotation of the chain wheel 14. The same movement of the handlebars 31 causes the chain 41 attached to the lug 36 to be pulled by its associated tension spring 42 around its associated unidirectional sprocket wheel, with corresponding free movement of that sprocket wheel around the axle 30 due to its ratchet or roller clutch connection arrangement.

When the rider of the cycle pushes the handlebars 31 in the direction of arrow C, the movement of the lug 36 causes the chain 41 to be pulled around its associated sprocket wheel 38A and drive the axle 30 (in the manner already indicated) while the movement of the lug 37 relaxes the chain 39 so that it moves its sprocket wheel 38 freely in the opposite sense around axle 30 under the action of the tension spring 40.

The sprocket wheels rotated by the chains 39 and 41 may be replaced by drums which are rotated by associated cables wound around, and connected to, their outer surfaces.

The precise location and dimensions of the support rod 35, and the positions of lugs 36 and 37 relative to the axis of the chain wheel 14, may be varied, but these parameters should be selected to use the strength characteristics of the human arm most efficiently. As with the human leg, the human arm can exert a greater force when at full stretch than when fully bent (the increase at full stretch has been reported to be about 30 percent).

As will be apparent to mechanical engineers, the driving of the rear wheel 13 is by a main chain 11 which passes around the chain wheel 14 and also around the conventional sprocket wheel mounted on the rear wheel hub. Conventional gearing arrangements can be used with this drive of the rear wheel 13, the gear selection being controlled by a cable connected to a gearshift lever that is mounted on the handlebar support rod 35 or on the frame 12 (also conventional practice).

Figure 5:
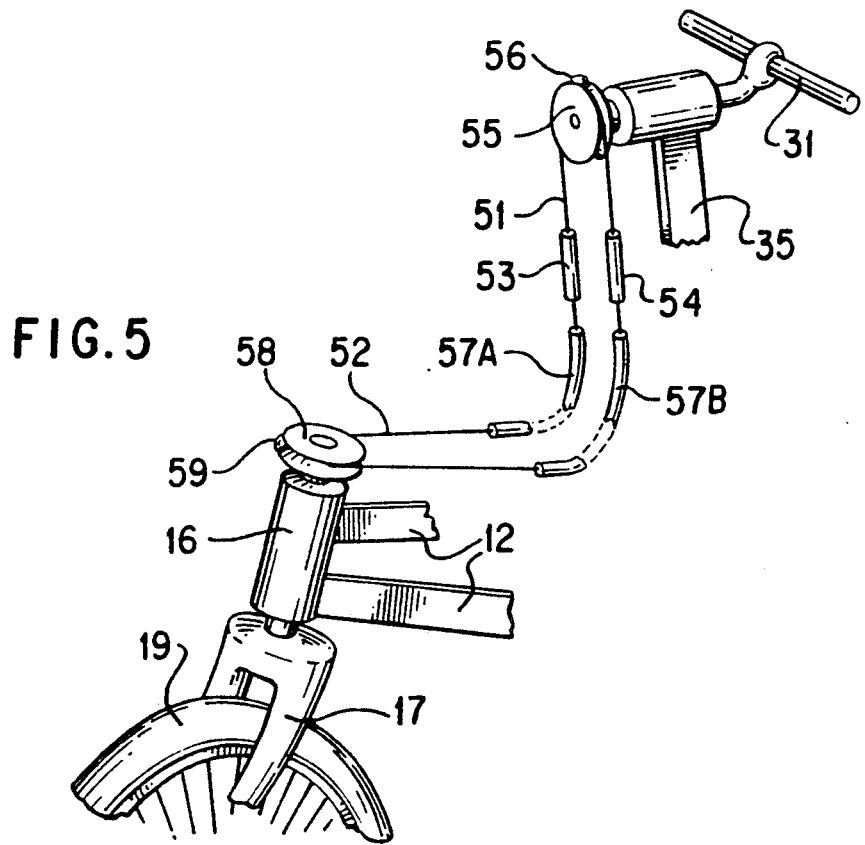
FIG. 5 shows the steering mechanism that may be used with the bicycle shown in FIG. 1.

The steering mechanism that has been adopted for a prototype of the present invention is illustrated in FIG. 5. Its main components are a pair of cables 51 (the upper cable) and 52 (the lower cable) which are connected to form a continuous loop by a pair of turnbuckles 53 and 54.

The upper cable 51 extends from the turnbuckle 53 and passes around the edge (which is grooved or hollowed) of a first disc 55 that is connected directly to the handlebars 31 of the cycle, to the other turnbuckle 54. A ball 56 is swaged on to the cable 51 at the midpoint of the cable 51. The ball 56 is firmly seated in a cup in the edge of the disc 55.

The lower cable 52 also extends from the turnbuckle 53 to the turnbuckle 54, and passes downwards through a first flexible cable sheath 57A, around the grooved or hollowed edge of a second disc 58, then upwards through a second flexible cable sheath 57B. A steel ball 59 is swaged on to the cable 52 at its midpoint. The ball 59 is firmly seated in a cup in the edge of the second disc 58. The disc 58 is rigidly mounted on the end of the shaft which extends from the front forks 17 of the cycle. The cable sheaths 57A and 57B are secured, near each end of each sheath, to the support rod 35 and to the cycle frame 12, respectively.

Rotation of the handlebars 31 rotates the disc 55, and thus moves the ball 56 and hence the upper cable 51. Movement of the upper cable 51 results in corresponding movement of the lower cable 52 and thus of the ball 59, causing rotation of the lower disc 58. Rotation of the lower disc 58 causes corresponding rotation of the shaft from the front forks 17, and thus steers the cycle.

Mechanical engineers will appreciate that modified forms of this steering mechanism may be adopted. For example, one turnbuckle only need be used, or the discs 55 and 58 may be replaced with bars connected to the handlebars and front forks to which cable ends are directly connected.

It will be apparent from the above description that the cycle illustrated in FIG. 1 is propelled by the action of either of the pendulums 23 or by the pushing or pulling of the handlebars 31. Since the rider's arms move the handlebars 31 (and thus the support rod 35) and the rider's legs are used to move the pendulums 23, the cycle can be propelled (a) by moving only the rider's arms backwards and forwards without any use of the legs, (b) by using one leg only, (c) by moving both legs together or alternately, or (d) by the combination of arm and leg movements simultaneously. In a preferred mode of propelling the cycle on level ground, the rider can adopt a "rowing" movement, by simultaneously pulling the handlebars with both arms and pushing the pendulums with both feet, thus enabling the rider to utilizes the power available from the muscles of the shoulders, stomach and back, as well as from the muscles in the arms and the legs.

The adoption of a reclining position for the rider of the cycle is preferred because (a) this position presents a low frontal area of the cycle plus rider, and thus minimizes drag, and (b) the combined arm and leg propulsion movements can be conveniently performed with the rider seated in a reclining position. However, other riding positions may be adopted, provided the propulsion arrangements are rearranged.

The ability of a person to use both arms and legs for the propulsion of a bicycle constructed to have the features illustrated in FIG. 1 makes such a cycle ideally suited for adaptation to an exercise cycle, for it enables a user of the exercise cycle to exercise a range of selected combinations of muscles. Any one of a number of known arrangements for mounting the cycle to be stationary and applying a partial brake to the driven wheel may be used to convert the cycle to an exercise machine.

Skilled mechanical engineers will appreciate that although a specific realization of the present invention and some alternative arrangements have been described above, modifications to the illustrated and described arrangements may be made without departing from the inventive concept. In particular, (a) a range of alternative geometries may be used for the connections between the support rod 35 and the sprocket wheels (or discs) driven by the hand movements of the rider of the cycle;

(b) the hand movement may operate to propel the cycle or wheeled chair only in the "pulling" mode of moving the support rod 35;

(c) the pedals may be equipped with foot securing means so that the pendulums can be both pushed and pulled by the feet of a rider of the cycle, with propulsion achieved by both movements;

(d) in the exercise cycle, power generation or wheeled chair implementation of the present invention, a separate arm propulsion rod may be provided for each arm of the operator of the equipment;

(e) a single pendulum may be used-operated by both legs of the rider of the cycle;

(f) the adoption of linear bearings on appropriately located rods in place of pivoted rods; and (g) when drums equipped with roller clutches are used in place of sprocket wheels, such substitute drums being rotated to drive the axle 30 by movement of a first cable or cord passing at least partially around, and attached to, the outer surface of the drum, the use of a second cable or cord wound at least partially around the drum and connected at one end to the circumference of the drum and at the other end to a recoil device constituting the biasing means of the invention.

This list of alternative or modified arrangements is not intended to be exhaustive.

I claim:

1. An arm operated driving mechanism for a first rotatable member (14) which is fixedly mounted on a first axle (30) which is supported for rotation on a frame (12), said driving mechanism comprising:

a) a pair of second rotatable members (38) mounted coaxially with said first rotatable member and connected to said first axle by an arrangement which permits rotation with said first axle in one direction of rotation but free movement about said first axle in the opposite direction of rotation;

b) a hand-moveable lever (35) having an upper end and a lower end, said lever being mounted on a second axle (33) supported on said frame remote from said first axle, said lever being rotatable about said second axle in a substantially vertical plane between a first position in which said upper end is in a forward position and a second position in which said upper end is in a rearward position; said lever having first and second connection points (37, 36) thereon;

c) a connection means (39, 41), each said connection means passing at least partly around said second rotatable member and being connected thereto, one end of each said connection means being connected to a respective one of said connection points, whereby movement of said lever from said first position to said second position causes one of said connection means to be pulled around, and thereby rotate, its respective second rotatable member, to rotate said first axle and hence said first rotatable member, and movement of said lever from said second position to said first position causes the other of said means to be pulled around, and thereby rotate, its respective second rotatable member, to rotate said first axle and hence said first rotatable member;

d) biasing means (40, 42) associated with each said connection means, for biasing its associated connection means in the opposite direction to the direction of movement thereof which causes rotation of said first axle.

2. An arm operated driving mechanism as claimed in claim 1 wherein said each second rotatable member is a sprocket wheel.

3. An arm operated driving mechanism as claimed in claim 2 wherein said connection means is a pair of chains.

4. An arm operated driving mechanism as claimed in claim 1 wherein said each second rotatable member is a drum.

5. An arm operated driving mechanism as claimed in claim 4 wherein said connection means is a pair of cables.

6. An arm operated driving mechanism for a first rotatable member (14) which is fixedly mounted on a first axle (30) which is supported for rotation on a frame (12), said driving mechanism comprising:

a) a pair of second rotatable members (38) mounted coaxially with said first rotatable member and connected to said first axle by an arrangement which permits rotation with said first axle in one direction of rotation but free movement about said first axle in the opposite direction of rotation;

b) a hand-moveable lever (35) having an upper end and a lower end, said lever being mounted on a second axle (33) supported on said frame remote from said first axle, said lever being rotatable about said second axle in a substantially vertical plane between a first position in which said upper end is in a forward position and a second position in which said upper end is in a rearward position; said lever having first and second connection points (37, 36) thereon;

c) a connection means (39, 41), each said connection means passing at least partly around said second rotatable member and being connected thereto, one end of each said connection means being connected to a respective one of said connection points, whereby movement of said lever from said first position to said second position causes one of said connection means to be pulled around, and thereby rotate, its respective second rotatable member, to rotate said first axle and hence said first rotatable member, and movement of said lever from said second position to said first position causes the other of said means to be pulled around, and thereby rotate, its respective second rotatable member, to rotate said first axle and hence said first rotatable member;

d) biasing means (40, 42) associated with each said connection means, for biasing its associated connection means in the opposite direction to the direction of movement thereof which causes rotation of said first axle;

e) a leg operated driving mechanism for said first rotatable member (14) which is fixedly mounted on said first axle (30) which is supported for rotation on said frame (12), said leg operated driving mechanism comprising:

i) a pair of third rotatable members (28) mounted coaxially with said first and second rotatable members and connected to said first axle by an arrangement which permits rotation with said first axle in one direction of rotation but free movement about said first axle in the opposite direction of rotation;

ii) a pair of pendulums (23), each pendulum having an upper end and a lower end (24) and being mounted at or near the upper end thereof for rotation about a second axle (22) mounted on said frame remote from said first axle, the lower end of each pendulum being moveable in an arc from a rearward position to a forward position;

iii) a second connection means (26), each said second connection means passing at least partly around and engaging with said third rotatable members and being connected thereto, one end of each said second connection means being connected to a respective one of said pendulums at a point (27) between said second axle and said lower end of the pendulum, whereby movement of the lower end of each pendulum from its rearward position to its forward position causes its associated chain or cable to the pulled around, and thereby rotate, its respective third rotatable member, to rotate said first axle and hence said first rotatable member; and iv) biasing means (29) associated with each said third connection means, for biasing its associated third connection means in the opposition direction to the direction of movement thereof which causes rotation of said first axle, and hence for biasing its associated pendulum to its rearward position.

7. An arm operated driving mechanism as claimed in claim 6 wherein each of said second rotatable members is a sprocket wheel.

8. An arm operated driving mechanism as claimed in claim 7 wherein said connection means is a pair of chains.

9. An arm operated driving mechanism as claimed in claim 8 wherein said each second rotatable member is a drum.

10. An arm operated driving mechanism as claimed in claim 9 wherein said connection means is a pair of cables.

11. A leg operated driving mechanism as defined in claim 6, in which each of said pendulums (23) has a pedal (25) at its lower end.

12. A leg operated driving mechanism as defined in claim 6, in which each of said pendulums has a shape such that when the pendulum is moved from said rearward position to said forward position, said first rotatable member is driven through a progressively greater angle for a unit displacement of the lower end of the pendulum.

13. A driving mechanism as defined in claim 6, in which said frame (12) is the frame of a human powered apparatus, wherein a seat is mounted on said frame for the user of said vehicle, and said first rotatable member (14) is a chain wheel.

14. An arm operated driving mechanism for a first rotatable member (14) which is fixedly mounted on a first axle (30) which is supported for rotation on a frame (12), said driving mechanism comprising:

a) a pair of second rotatable members (38) mounted coaxially with said first rotatable member and connected to said first axle by an arrangement which permits rotation with said first axle in one direction of rotation but free movement about said first axle in the opposite direction of rotation;

b) a hand-moveable lever (35) having an upper end and a lower end, said lever being mounted on a second axle (33) supported on said frame remote from said first axle, said lever being rotatable about said second axle in a substantially vertical plane between a first position in which said upper end is in a forward position and a second position in which said upper end is in a rearward position, said lever having first and second connection points (37, 36) thereon;

c) a connection means (39, 41), each said connection means passing at least partly around said second rotatable member and being connected thereto, one end of each said connection means being connected to a respective one of said connection points, whereby movement of said lever from said first position to said second position causes one of said connection means to be pulled around, and thereby rotate, its respective second rotatable member, to rotate said first axle and hence said first rotatable member, and movement of said lever from said second position to said first position causes the other of said means to be pulled around, and thereby rotate, its respective second rotatable member, to rotate said first axle and hence said first rotatable member;

d) biasing means (40, 42) associated with each said connection means, for biasing its associated connection means in the opposite direction to the direction of movement thereof which causes rotation of said first axle; and e) a leg operated driving mechanism for a first rotatable member (14) which is fixedly mounted on said first axle (30) which is supported for rotation on said frame (12), said leg operated driving mechanism comprising:

i) a pair of third rotatable members (28) mounted coaxially with said first and second rotatable members and connected to said first axle by an arrangement which permits rotation with said first axle in one direction of rotation but free movement about said first axle in the opposite direction of rotation;

ii) a pair of pendulums (23), each pendulum having an upper end and a lower end (24) and being mounted at or near the upper end thereof for rotation about a second axle (22) mounted on said frame remote from said first axle, the lower end of each pendulum being moveable in an arc from a rearward position to a forward position;

iii) a second connection chains (26), each said second connection means passing at least partly around and engaging with said third rotatable members and being connected thereto, one end of each said second connection means being connected to a respective one of said pendulums at a point (27) between said second axle and said lower end of the pendulum, whereby movement of the lower end of each pendulum from its rearward position to its forward position causes its associated chain or cable to the pulled around, and thereby rotate, its respective third rotatable member, to rotate said first axle and hence said first rotatable member; and iv) biasing means (29) associated with each said third connection means, for biasing its associated third connection means in the opposition direction to the direction of movement thereof which causes rotation of said first axle, and hence for biasing its associated pendulum to its rearward position; and f) a steering mechanism comprising:

i) a handlebar member (31) attached to a first shaft mounted for rotation near an upper end of said lever (35);

ii) a second shaft extending from a support for a front wheel and mounted for rotation within a steering head member (16) of said frame; and iii) cable means (51, 52) connecting said first shaft and said second shaft, whereby rotation of said first shaft causes a corresponding rotation of said second shaft.

15. An arm operated driving mechanism as defined in claim 14, in which said cable means comprises a cable having at least one turnbuckle (53, 54) therein, said cable passing partially around the circumference of a first disc (55) attached rigidly to said first shaft and partially around a second disc (58) attached rigidly to said second shaft, a pair of steel balls (56, 59) being swaged to said cable in locations whereby one of said steel balls (56) is seated firmly in a cup in the circumference of said first disc and the other steel ball (59) is seated firmly in a cup in the circumference of said second disc.

16. A driving mechanism as defined in claim 14, in which said first rotatable member (14) is a chain wheel of a drive mechanism and said frame supports a seat for a user.

17. A driving mechanism as defined in claim 14, including at least a pair of levers, each having an upper end and a lower end and being mounted for rotation in substantially vertical planes about respective second axles mounted on said frame, said rotation being between a first position in which said upper end has a forward location and a second position in which said upper end has a rearward location; and being operable to rotate a respective one of said connection means during movement either from said first position to said second position or from said second position to said first position.

18. A driving mechanism as defined in claim 14 in which said biasing means is a tension spring or a recoil mechanism.

19. A driving mechanism as defined in claim 14, including a hub mounted for rotation about an associated axle.

20. A driving mechanism as defined in claim 14, in which said first rotatable member is a chain wheel of a drive mechanism for equipment for generating electrical power.

* * * * *